United States Patent [19]

Dewitt et al.

[11] 3,860,528

[45] Jan. 14, 1975

[54] CHEMICAL COMPOSITION CONTAINING MIXED OLEFINS

[75] Inventors: William J. Dewitt; Melvin E. Tuvell, both of Baton Rouge, La.

[73] Assignee: Ethyl Corporation, Richmond, Va.

[22] Filed: Aug. 7, 1972

[21] Appl. No.: 278,553

Related U.S. Application Data

[63] Continuation-in-part of Ser. No. 45,151, June 10, 1970, abandoned.

[52] U.S. Cl................. 252/182, 252/536, 252/555, 260/677 R
[51] Int. Cl............................................. C07c 11/00
[58] Field of Search.................... 252/182, 536, 555; 260/677 R

[56] References Cited
UNITED STATES PATENTS

| | | | |
|---|---|---|---|
| 3,267,167 | 8/1966 | Waack | 260/677 R |
| 3,367,987 | 2/1968 | Walsh | 260/677 R |
| 3,424,810 | 1/1969 | Suatoni | 260/677 R |
| 3,586,734 | 6/1971 | Ichiki et al. | 260/683.15 D |

Primary Examiner—Benjamin R. Padgett
Assistant Examiner—Irwin Gluck
Attorney, Agent, or Firm—Donald L. Johnson; John F. Sieberth; Shelton B. McAnelly

[57] ABSTRACT

Olefin mixtures are disclosed having from about 12 to about 16 carbon atoms per molecule and averaging about 14.1 to about 15.9 carbon atoms per molecule and containing predominantly unbranched acyclic terminal monoolefins in admixture with from about 3 to about 30 mol percent of beta-branched terminal olefins and from about 3 to about 12 mol percent of internal olefins.

7 Claims, 2 Drawing Figures

CHEMICAL COMPOSITION CONTAINING MIXED OLEFINS

CROSS REFERENCE TO RELATED APPLICATIONS

This application is a continuation-in-part of prior application Ser. No. 45,151, filed June 10, 1970 and now abandoned.

BACKGROUND OF THE INVENTION

1. Field of the Invention

The invention relates to mixtures of olefins having from about 12 to about 16 carbon atoms per molecule which are predominantly unbranched acyclic terminal monoolefins in admixture with vinylidene olefins and internal olefins in specified proportions. The olefin mixtures are particularly useful for producing sulfonates. Preferred olefin sulfonates have useful properties as detergents for washing fabrics, skin, etc. either in the form as produced or in admixture with other detergent actives and adjuvants, and as liquid, powder, flakes, bars, pastes and the like.

2. Description of the Prior Art

Olefins are well known in the prior art as being useful for producing sulfonates by a reaction with $SO_3$ or with compounds or complexes containing or yielding $SO_3$. Of particular interest is the reaction with uncomplexed $SO_3$. The reaction is followed by saponification with a caustic or alkaline substance such as a hydroxide, oxide or carbonate of the alkali or alkaline earth metals, such as NaOH and KOH, to produce water soluble metal salts. These products have useful properties for various washing purposes such as cleansing fabrics, skin and dishes. The carbon skeletal structures of the sulfonates are basically isomeric unsaturated and hydroxy saturated isomers having carbon skeletons similar to the starting olefins. Typically, $RCH_2CH_2CH_2CH=CH_2$ reacted with $SO_3$ produces predominantly compounds of the formulas:

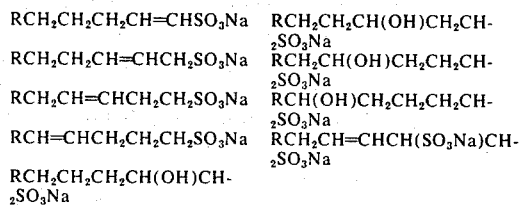

The prior art teaches generally that such sulfonates can be produced on a basis of olefins of various carbon skeletal configurations having 10 to 24, mor or less, carbon atoms per molecule. For the most part, the prior art preference is for the use of olefins having a single molecular structural configuration, particularly straight chain olefins of the alpha type and for olefins that have 16 or more, preferably 18 or more, carbon atoms per molecule. Thus in the prior art, R of the foregoing formulae is generally a straight chain saturated alkyl group having 5 to 19, more or less, carbon atoms, particularly 11 or more, preferably 13. In some instances olefins have been used that were different from such straight chain olefins. The plurally branched propylene tetramer, for example, has been mentioned. Internal olefins and vinylidene olefins, individually, have been mentioned in a general way but for the most part there is no teaching of synergism in sulfonate mixtures based on mixed olefins.

SUMMARY OF THE INVENTION

The present invention provides synergistic compositions of olefins of certain mixed structures and of a specific narrow range of molecular weights, otherwise expressed as number of carbon atoms per molecule. Derivatives of such olefins have excellent detergent properties, particularly as regards solubility and cleaning ability even in hard water. The materials are useful for washing porous materials such as fabrics; surfaces of living organisms, typically the skin and hair of human beings or lower animals; and for washing materials have hard, comparatively impervious, surfaces such as sheet metal or plastics in various forms including but not limited to dishes and silverware. The materials are useful at intermediate temperatures, at low temperatures such as 20°–30°C, as well as at hot water temperatures, typically 80° to 100°C or higher, and at atmospheric pressure or higher or lower pressures. Utility under such a wide variety of conditions permits a single composition to be used for most if not all cleaning applications for an entire family or business establishment, for example. Although the preferred sulfonate compositions may be obtained by sulfonating pure individual olefins and blending the sulfonate derivatives in the proper proportions, it is preferred to sulfonate mixtures of olefins which correspond to the desired sulfonate mixtures. Preferred olefin mixtures correspond substantially to the sulfonates on molecular weight and carbon chain structure distribution bases. Such olefin mixtures are particularly desirable and have substantial utility to produce the sulfonates.

DESCRIPTION OF THE PREFERRED EMBODIMENTS

Figure 1:
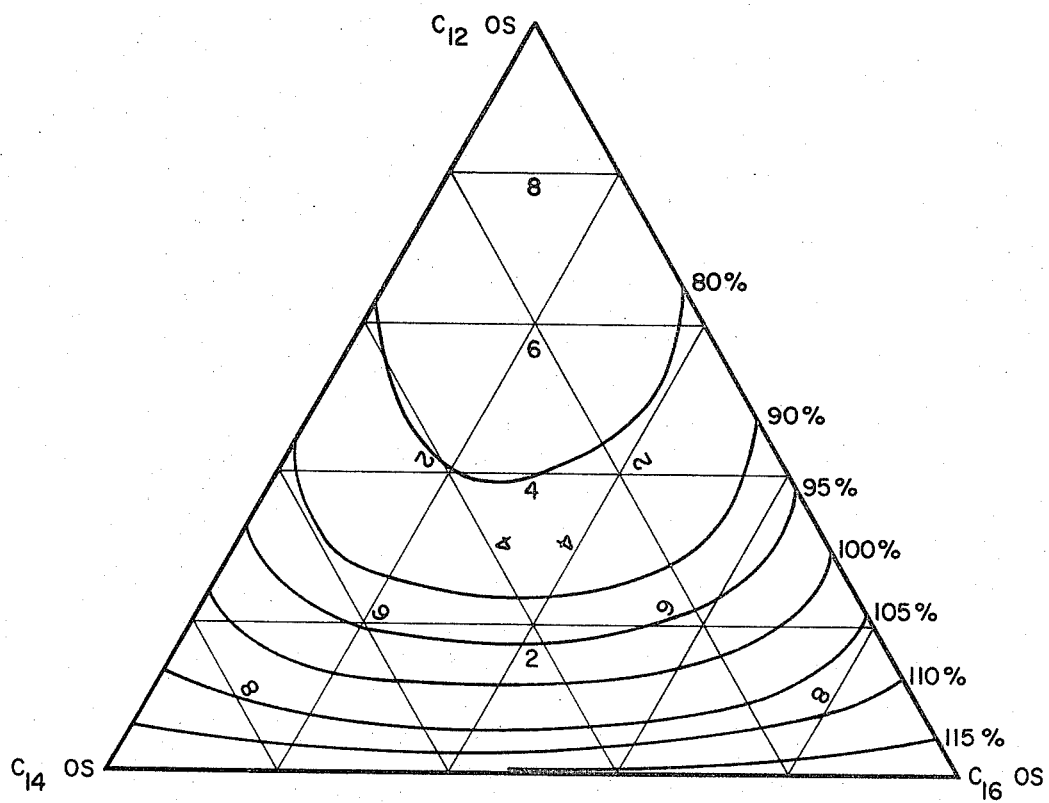
FIG. 1 is a ternary diagram showing the properties of various olefin sulfonate compositions. Equal-effectiveness lines for various compositions are shown based on comparison with a standard detergent system.

In accordance with the present invention, monoolefin mixtures having from about 12 to about 16 carbon atoms per molecule and averaging from about 14.1 to about 15.9 carbon atoms per molecule are disclosed. Preferred monoolefin mixtures contain olefins having 14 and 16 carbon atoms per molecule wherein the weight ratio of $C_{14}$ to $C_{16}$ olefins is from about 5.7/1 to about ½, preferably from about 4/1 to about 3/2, particularly from about 3.5/1 to about 2/1. Preferred olefins range from about 60 to about 90 mol percent vinyl, from about 3 to about 30 mol percent vinylidene and from about 3 to about 12 mol percent internal olefins. Olefin mixtures may include $C_2$, $C_{13}$, $C_{14}$, $C_{15}$, $C_{16}$ components provided that the mixtures meet the foregoing requirements. Of these, preferred olefins are those containing an even number of carbon atoms per molecule.

Typical $C_{12}$ olefins are of 99 percent (by weight) $C_{12}$ purity as measured by V.P.C., the balance being mostly traces of $C_{10}$ and $C_{14}$. These olefins analyzed by NMR (mol percent basis) are 93.0 vinyl, 3.7 vinylidene and 3.3 internal.

Typical $C_{14}$ olefins are of 98.7 percent (by weight) $C_{14}$ purity as measured by V.P.C., the balance being about 0.6 percent $C_{12}$ and about 0.7 percent $C_{16}$. NMR analysis is 85.5 percent (molar) vinyl, 8.4 percent vinylidene and 6.1 percent internal. Paraffin content is 0.3 percent by weight.

Typical $C_{16}$ olefins are of 96 percent (by weight) $C_{16}$ purity, with about 3.0 percent $C_{14}$ and about 1 percent $C_{18}$. NMR analysis is 63.0 percent (molar) vinyl, 27.2 percent vinylidene and 9.8 percent internal.

Such olefins are preferably produced by chain growth with ethylene on triethyl aluminum.

Typical olefin mixtures useful in accordance with the present invention are characterized in two fundamental aspects; viz, (1) molecular weight and (2) carbon skeletal structure. Broad and preferred ranges exist in regard to each aspect individually and in the various possible combinations of the two aspects.

Typical olefin mixtures useful for sulfonation and saponification to produce derivatives as recited herein have components defined on a molecular weight basis as having from about 12 to about 16 carbon atoms per molecule, averaging from about 14.1 to about 15.9 carbon atoms per molecule. The weight ratio of $C_{14}$ to $C_{16}$ olefins in the mixture is from about 5.7/1 to about ½. A narrower range more preferred is from about 4/1 to about 3/2 with from about 3.5/1 to about 2/1 being even more preferred.

Typical olefin mixtures useful for sulfonation and hydrolysis to produce derivatives as recited herein have components defined on a carbon skeleton structure basis as consisting essentially of from about 60 to about 90 mol percent vinyl olefins, from about 3 to about 30 mol percent vinylidene olefins and from about 3 to about 12 mol percent internal olefins. In most instances the olefins of different molecular weights in a given mixture have different distributions in regard to carbon skeleton structure but are within the ranges recited.

Typical preferred olefin mixtures have from about 12 to about 16 carbon atoms per molecule, average from about 14.1 to about 15.9 carbon atoms per molecule and have a weight ratio $C_{14}/C_{16}$ of about 5.7/1 to ½ and consist essentially of from about 60 to about 90 mol percent vinyl olefins, from about 3 to about 30 mol percent vinylidene olefins and from about 3 to about 12 mol percent internal olefins.

Typical preferred olefin mixtures have from about 12 to about 16 carbon atoms per molecule, average from about 14.1 to about 15.9 carbon atoms per molecule, have a weight ratio of $C_{14}/C_{16}$ of from about 3.5/1 to about 2/1 and consist essentially of from about 60 to about 90 mol percent vinyl olefins, from about 3 to about 30 mol percent vinylidene olefins and from about 3 to about 12 mol percent internal olefins.

Typical preferred olefin mixtures have a weight ratio $C_{14}/C_{16}$ of about 3.5/1 to 2/1 wherein the $C_{14}$ olefins are from about 80 to about 90 mol percent vinyl olefins, from about 5 to about 12 mol percent vinylidene olefins and from about 5 to about 12 mol percent internal olefins and wherein the $C_{16}$ olefins are from about 60 to about 70 mol percent vinyl olefins, from about 20 to about 30 mol percent vinylidene olefins and from about 5 to about 12 mol percent internal olefins.

When such mixtures of olefins are reacted with $SO_3$ and saponified with NaOH, for example, the products are principally isomeric spectra of alkene sulfonic acid sodium salts, hydroxy alkane sulfonic acid sodium salts, alkene disulfonic acid disodium salts and hydroxy alkane disulfonic acid disodium salts. Similarly, where the saponification is with caustic potash the products are potassium salts of these acids. These compounds are termed olefin sulfonates. They are exemplified (as sodium salts) by the basic formulas:

$R-CH_2CH_2CH_2CR'=CR''(SO_3Na)$
$R-CH_2CH_2CH=CR'CHR''(SO_3Na)$
$R-CH_2CH=CHCHR'CHR''(SO_3Na)$
$R-CH=CHCH_2CHR'CHR''(SO_3Na)$
$RCH_2CH_2CH_2CR'(OH)CHR''(SO_3Na)$
$RCH_2CH_2CH(OH)CHR'CHR''(SO_3Na)$
$RCH_2CH(OH)CH_2CHR'CHR''(SO_3Na)$
$RCH(OH)CH_2CH_2CHR'CHR''(SO_3Na)$
$RCH_2CH=CHCR'(SO_3Na)CHR''(SO_3Na)$
$RCH=CHCH_2CR'(SO_3Na)CHR''(SO_3Na)$
$RCH_2CH(OH)CH_2CR'(SO_3Na)CHR''(SO_3Na)$
$RCH(OH)CH_2CH_2CR'(SO_3Na)CHR''(SO_3Na)$ where R, R' and R'' are H or alkyl ($C_nH_{2n+1}$) and wherein the total number of carbon atoms in R, R' and R'' is predominantly 7, 9 and 11.

Additional components which may be present in trace amounts include trisulfonates and higher order sulfonates. The ratios of the various sulfonates of these categories normally present on a weight basis in the products of this invention are from about 30 to about 70 percent of alkene sulfonates, from about 20 to about 70 percent of hydroxy alkane sulfonates, from about 2 percent to about 15 percent of the disulfonates, and about 1 percent or less of trisulfonates, etc., such polysulfonates containing approximately equal amounts of alkene and hydroxy alkane compounds.

The foregoing sulfonate compounds are believed to be the result of the formation and cleavage of sultone intermediates. Such sultone intermediates form preferentially as rings with a specific number of atoms per ring, typically 5. Rings of other numbers of atoms such as 4 and 6 are formed generally in lesser proportions. On hydrolysis the sultones open to provide the alkene sulfonates and hydroxy alkane sulfonates where the location of the unsaturation and hydroxyl groups depend to a large extent upon the number of atoms in the rings of the intermediate sultones. Some futher ramification of the distribution of the various forms arises through isomerization. Thus, it is characteristic of the alkene sulfonates that they have predominantly 2–3 unsaturation (30–70 percent) with some 1–2 unsaturation (10–25 percent), some 3–4 unsaturation (5–25 percent), some 4–5 unsaturation (5–10 percent) and so on. Similarly, it is characteristic of the hydroxy alkane sulfonates that they are predominantly 3-hydroxy compounds (about 50–70 percent) with lesser amounts of 2-hydroxy, 4-hydroxy and 5-hydroxy compounds. The disulfonates, trisulfonates may be regarded as the result of the reaction of additional molecules of $SO_3$ with the double bond of an alkene sulfonate precursor and hence involve further ramifications as several spectra based on the spectra of alkene sulfonates.

It is evident that the hydrocarbon structures of the various compounds exemplified are principally constituted by a ramified substituent containing portion or radical having about 5 carbon atoms connected to a long unsubstituted hydrocarbon radical. In general, the length variation of the unsubstituted radical is small over the range of 12–16 total carbon atoms per molecule, thus it is not essential that the relative proportions of vinyl, vinylidene and internal olefin structures be the same for all starting olefins or the resultant products. Although such similarity of distributions for the various molecular weights is preferred in some instances, it is preferred in some instances that there be a higher percentage of non-vinyl molecular structures in the $C_{16}$ starting olefins than in the $C_{14}$ starting olefins thereby maintaining a greater degree of similarity in the number of carbon atoms in the long unsubstituted hydrocarbon radical.

Eamples of typical compounds in the mixtures described herein include the following.

tetradec-1,2-ene-1-sulfonic acid sodium salt
hexadec-1,2-ene-1-sulfonic acid potassium salt
dodec-1,2-ene-1-sulfonic acid sodium salt
tetradec-2,3-ene-1-sulfonic acid sodium salt
hexadec-2,3-ene-1-sulfonic acid sodium salt
tetradec-3,4-ene-1-sulfonic acid potassium salt
hexadec-3,4-ene-1-sulfonic acid sodium salt
dodec-3,4-ene-1-sulfonic acid sodium salt
tetradec-4,5-ene-1-sulfonic acid sodium salt
hexadec-4,5-ene-1-sulfonic acid sodium salt
2-ethyl-dodec-1,2-ene-1-sulfonic acid sodium salt
2-butyl-decyl-1,2-ene-1-sulfonic acid sodium salt
2-hexyl-oct-1,2-ene-1-sulfonic acid potassium salt
2-ethyl-tetradec-1,2-ene-1-sulfonic acid sodium salt
2-butyl-dodec-1,2-ene-1-sulfonic acid sodium salt
2-hexyl-dec-1,2-ene-1-sulfonic acid sodium salt
tetradec-3,4-ene-3-sulfonic acid sodium salt
hexadec-3,4-ene-3-sulfonic acid sodium salt
tetradec-6,7-ene-6-sulfonic acid sodium salt
hexadec-6,7-ene-6-sulfonic acid potassium salt
4-ethyl-dodec-3,4-ene-3-sulfonic acid sodium salt
4-ethyl-tetradec-3,4-ene-3-sulfonic acid sodium salt
undec-7,8-ene-5-(1'-ethyl methylene sulfonic acid potassium salt
tridec-7,8-ene-5-(1'-ethyl methylene sulfonic acid sodium salt)
tetradec-3,4-ene-1,2-disulfonic acid-disodium salt
hexadec-3,4-ene-1,2-disulfonic acid-disodium salt
undec-6,7-ene-5-sodium sulfonate-5-(1'-ethyl-methylene potassium sulfonate)
tridec-6,7-ene-5-sodium sulfonate-5-(1'-ethyl-methylene sodium sulfonate)
tetradec-4,5-ene-1,2-disulfonic acid-disodium salt Examples of other typical compounds in the mixtures described herein include the following.

tetradec-2-ol-1-sulfonic acid sodium salt
hexadec-2-ol-1-sulfonic acid sodium salt
tetradec-3-ol-1-sulfonic acid sodium salt
hexadec-3-ol-1-sulfonic acid sodium salt
tetradec-4-ol-1-sulfonic acid potassium salt
hexadec-4-ol-1-sulfonic acid sodium salt
tetradec-5-ol-1-sulfonic acid sodium salt
hexadec-5-ol-1-sulfonic acid sodium salt
2-ethyl-dodec-2-ol-1-sulfonic acid sodium salt
2-butyl-decyl-3-ol-1-sulfonic acid sodium salt
2-hexyl-oct-4-ol-1-sulfonic acid potassium salt
2-ethyl-tetradec-3-ol-1-sulfonic acid sodium salt
2-butyl-dodec-2-ol-1-sulfonic acid sodium salt
2-hexyl-dec-3-ol-1-sulfonic acid sodium salt
tetradec-4-ol-3-sulfonic acid sodium salt
hexadec-5-ol-3-sulfonic acid sodium salt
tetradec-7-ol-6-sulfonic acid sodium salt
hexadec-7-ol-6-sulfonic acid potassium salt
4-ethyl-dodec-4-ol-3-sulfonic acid sodium salt
4-ethyl-tetradec-4-ol-3-sulfonic acid sodium salt
undec-8-ol-5(1'-ethyl methylene sulfonic acid sodium salt)
tridec-8-ol-5-(1'-ethyl methylene sulfonic acid sodium salt)
tetradec-4-ol-1,2-disulfonic acid-disodium salt
hexadec-4-ol-1,2-disulfonic acid-disodium salt
undec-7-ol-5-sodium sulfonate-5-(1'-ethyl-methylene sodium sulfonate)
tridec-7-ol-5-sodium sulfonate-5-(1'-ethyl methylene sodium sulfonate)
tetradec-5-ol-1,2-disulfonic acid-dipotassium salt The sulfonate compositions are useful as detergents per se and in combination with other detergent active compounds, builders and adjuvant compounds. These materials are well known in the art.

Other actives useful in conjunction with the sulfonate compositions include anionic, nonionic, ampholytic and zwitterionic synthetic detergents individually and in various combination. Typical other actives include alkali metal and ammonium salts of higher fatty acids, alcohol sulfates, linear alkyl sulfonates, alkali metal, alkaline earth metal and ammonium alkaryl sulfonates and fatty alcohol alkoxy sulfates. Typical specific compositions include sodiumdodecylbenzenesulfonate, sodium xylene sulfonate, sodiumnonylphenol ether sulfate (40 percent ethylene oxide).

Builders are ordinarily used such as water soluble inorganic alkaline builder salts, water soluble organic alkaline builder salts, and mixtures thereof. The proportions of builders to such sulfonate compounds generally range from about 10:1 to about 1:10 by weight, with about 5:1 to about 1:2 being preferred.

Typical builders for use with olefin sulfonates are well known as, for example, set forth in U.S. Pat. No. 3,332,880. They include ammonium or alkali metal borates, carbonates, and phosphates; ammonia or alkali metal polycarboxylates, alkali metal polyphosphonates. Typical builders are sodium tripolyphosphonate, trisodium nitrilotriacetate, potassium ethane-1-hydroxy-1,1-diphosphonate.

The following examples indicate preferred embodiments of the present invention.

EXAMPLE I

An olefin mixture was sulfonated, the product saponified and tested for washing properties.

The starting olefins had the following weight percent distribution by carbon atoms per molecule using Vapor Phase Chromatography (VPC).

| | |
|---|---|
| $C_{12}$ | 0.4 |
| $C_{14}$ | 66.2 |
| $C_{16}$ | 33.4 |
| | 100.0 |

The molecular weight was 205. The average number of carbon atoms per molecule was 14.6. This is a mixture of about 2/1 weight ratio of $C_{14}/C_{16}$ olefins.

The overall distribution (mol percent) of the starting olefins on a basis of molecular structure as determined by Nuclear Magnetic Resonance (NMR) was as follows.

| | |
|---|---:|
| Vinyl olefins | 79.2 |
| Vinylidene olefins | 12.5 |
| Internal olefins | 8.2 |
| | 100.0 |

Paraffin contained in the olefins was 0.3 percent by weight.

The mixed olefins were reacted in a laboratory falling film sulfonation reactor system similar to that described in Soap and Chemical Specialty 43, 122 (May 1967) using an $SO_3$/olefin molar ratio of 1.075. The reactor was a jacketed tube of 5 mm internal diameter and 75 cm length. $SO_3$ and nitrogen (2.5 mol percent $SO_3$) were fed as a gaseous phase at the top. The olefin was also fed at the top and in a liquid phase. The reactor temperature was 32°–35°C. The olefin feed rate was 17.6 grams per hour per millimeter of internal periphery of the vertically disposed tubular reactor.

The saponification number of the sulfonation effluent was 204 mg KOH per gram. The free oil content was 2.3 wt. percent.

The sulfonation effluent was saponified by reaction at reflux for 8 hours with 1 Normal NaOH solution fed at 50°–60°C. The NaOH was used in about 25 percent excess above stoichiometric. After saponification, residual oil phase material was removed, then the mixture was cooled and back titrated to neutrality with 1 Normal $H_2SO_4$ to form product olefin sulfonates. The Klett color of the sodium salts was measured by "Klett-Summerson" photoelectric colorimeter (Model 900-3) using a 5 wt. percent aqueous solution. This measurement technique is discussed in U.S. Pat. No. 2,193,437. The Klett color was 123.

The olefin sulfonate was tested in the pure form and in various formulations using a Dishwashing Test (J.A.O.C.S. 43, 576 (1966)) to achieve a standard performance evaluation. This performance was compared to that of a representative standard washing preparation similar to commercial light duty dishwashing concentrates containing 60 percent LAS (linear alkyl benzene sulfonate, ultrawet K), 30 percent AES (alcohol ethoxy sulfate, Steol 4N) and 10 percent LDEA (lauryl diethanol amide, Ninol AA62 extra). Tests were with water of 50–150 ppm hardness at a temperature of 40°C using active concentration of 0.045 wt. percent.

Individual tests gave excellent results of about 68 percent comparative effectiveness relative to the standard in water of 50 parts per million hardness and about 75 percent comparative effectiveness in water of 150 parts per million hardness.

The olefin sulfonates (sodium salts) were formulated with a monoethanol amide (Stephan IMMEA) in a ratio of about 4 parts by weight of olefin sulfonates and 1 part of amide. With water of 150 parts per million hardness, the comparative effectiveness was better than the standard, about 113 percent of the standard.

The clear point of the unformulated olefin sulfonates was determined by making a standard aqueous solution containing 1 percent by weight of the olefin sulfonates at a temperature of about 40°C. The solution was clear at this temperature. The temperature was then lowered until the solution became cloudy and subsequently raised to a temperature at which the solution turned "clear." The latter transition is the "clear" point. The clear point was 26.5°C.

Other formulations were made using the 2/1 $C_{14}/C_{16}$ olefin sulfonates produced in this example. Compositions of 42 percent solids were made to resemble ordinary commercial liquid dishwashing detergent concentrates.

| | Formulation Composition Weight Percent | |
|---|---|---|
| | A | B |
| $C_{14}/C_{16}$ olefin sulfonates | 27.0 | 17.0 |
| Ammonium alkyl ether sulfate | 0.0 | 10.0 |
| Monoethanol amide (Stephan LMMEA) | 8.0 | 8.0 |
| Sodium toluene sulfate | 7.0 | 7.0 |
| Ethanol | 8.0 | 8.0 |
| Water | 50.0 | 50.0 |
| | 100.0 | 100.0 |
| Clear Point | 7.5°C | 9.8°C |

The ammonium alkyl ether sulfate was based on $C_{12}/C_{14}/C_{16}$ alcohols in about 53/39/5.4 weight percent proportions as measured by V.P.C. The alcohols were ethoxylated with 3 mols of ethylene oxide per mol of alcohol. The ethoxylated alcohols were sulfated with sulfamic acid.

The concentrates A and B were tested according to the standard Dishwashing Test in water of 50, 150 and 300 ppm hardness and in concentrate proportions in aqueous washing solution of 0.15 weight percent. The performance of these formulations A and B was superior in every instance in comparison to the representative standard washing preparation used for the comparative tests.

EXAMPLE II

Example I is repeated using KOH for saponification. Similar results are obtained.

EXAMPLE III

Example I is repeated using other various olefin mixtures having from about 12 to about 16 carbon atoms per molecule, averaging from about 14.1 to about 15.9 carbon atoms per molecule wherein the weight ratio of $C_{14}$ olefins to $C_{16}$ olefins is from about 4/1 to about 3/2, said olefins being further characterized as consisting essentially of from about 60 to about 90 mol percent vinyl olefins, from about 3 to about 30 mol percent vinylidene olefins and from about 3 to about 12 mol percent internal olefins.

Included in this example is a series of experiments wherein the olefins are characterized as consisting essentially of olefins having 14 and 16 carbon atoms per molecule and averaging from about 14.1 to about 15.9 carbon atoms per molecule wherein the weight ratio of $C_{14}$ olefins to $C_{16}$ olefins is from about 3.5/1 to about 2/1, said olefins having 14 carbon atoms per molecule being further characterized as consisting essentially of from about 80 to about 90 mol percent vinyl olefins, from about 5 to about 12 mol percent vinylidene olefins and from about 5 to about 12 mol percent internal olefins, said olefins having 16 carbon atoms per molecule being further characterized as consisting essentially of from about 60 to about 70 mol percent vinyl olefins, from about 20 to about 30 mol percent vinylidene olefins and from about 5 to about 12 mol percent internal olefins.

The sulfonation effluent is saponified and neutralized as in Example I to produce water soluble salts of alkene sulfonic acids, hydroxy alkane sulfonic acids and similar di-, tri- and higher-sulfonic acids. These olefin sulfonates are tested as in Example I providing desirable results.

EXAMPLE IV

Example I was repeated using mixed structure predominantly $C_{12}$ olefins of the following composition (weight percent by VPC).

| | |
|---|---|
| 10 | trace |
| $C_{12}$ | 99.0 |
| $C_{14}$ | trace |
| | 100.0 |

Paraffin was a trace of about 0.3 percent.
The structure of the olefins (mol percent by NMR) was.

| | |
|---|---|
| Vinyl olefins | 93.0 |
| Vinylidene olefins | 3.7 |
| Internal olefins | 3.3 |
| | 100.0 |

The $SO_3$/olefin molar feed ratio was 1.04.

$SO_3$ was fed in a 5.0 mol percent concentration with nitrogen. The reactor temperature was 38°–40°C. The olefin feed rate was 24 grams per hour per millimeter of internal periphery of the vertically disposed falling film reactor.

The sulfonation effluent was saponified, deoiled, and neutralized to produce olefin sulfonates which were used in blends with $C_{14}$ and $C_{16}$ olefin sulfonates as hereinafter described.

EXAMPLE V

Example IV was repeated using mixed structure predominantly $C_{14}$ olefins of the following composition (weight percent by VPC).

| | |
|---|---|
| $C_{12}$ | 1.3 |
| $C_{14}$ | 98.0 |
| $C_{16}$ | 0.7 |
| | 100.0 |

Paraffin content was a trace of about 0.3 percent.
The structure of the olefins (mol percent by NMR) was.

| | |
|---|---|
| Vinyl olefins | 82.0 |
| Vinylidene olefins | 10.9 |
| Internal olefins | 7.1 |
| | 100.0 |

Sulfonation conditions were the same as for Example IV except the olefin feed rate was 28 grams/hr/per peripheral millimeter.

The sulfonation effluent was saponified, deoiled, and neutralized to produce olefin sulfonates which were used in blends with $C_{12}$ and $C_{16}$ olefin sulfonates as hereinafter described.

EXAMPLE VI

Example IV was repeated using mixed structure predominantly $C_{16}$ olefins of the following composition (weight percent by VPC).

| | |
|---|---|
| $C_{14}$ | 3.0 |
| $C_{16}$ | 96.0 |
| $C_{18}$ | 1.0 |
| | 100.0 |

Paraffin was a trace of about 0.3 wt. percent.
The structure of the olefins (mol percent by NMR) was.

| | |
|---|---|
| Vinyl olefins | 63.0 |
| Vinylidene olefins | 27.2 |
| Internal olefins | 9.8 |
| | 100.0 |

Sulfonation conditions were similar to those for Example IV except that the olefin feed rate was 32 grams per hour per peripheral millimeter of the reactor.

The sulfonation effluent was saponified, deoiled and neutralized to produce olefin sulfonates which were blended with the olefin sulfonates of Examples IV and V in various proportions in the neat form and in formulations with other actives and adjuvants present to provide comparative performance data using the Dishwashing Test (J.A.O.C.S. 43, 576 (1966)).

Data for typical formulations of the present olefin sulfonates with a monoethanol amide (LMMEA manufactured by Stephan Chemical Company) are presented in FIG. 1 which is a ternary diagram for various proportions of $C_{12}$, $C_{14}$, and $C_{16}$ olefin sulfonates. The olefin sulfonate/amide ratio was 4/1 on a weight basis. The water hardness was 150 parts per million, the washing temperature was 49°C, the concentration of the actives in the washing solution was 0.045 percent by weight.

The comparison standard (100 percent performance) was a reference solution containing on a weight percent basis 60 percent LAS (linear alkyl benzene sulfate) (ultrawet K), 30 percent AES (alcohol ethoxy sulfate) (Steol 4N) and 10 percent LDEA (lauryl diethanol amide) (Ninol AA62 extra). The active concentration, water hardness and temperature were the same as with the present olefin sulfonate/monoethanol amide formulation.

The data plotted in FIG. 1 show that the present $C_{14}/C_{16}$ olefin sulfonates with little or no $C_{12}$ have excellent properties.

Figure 2:
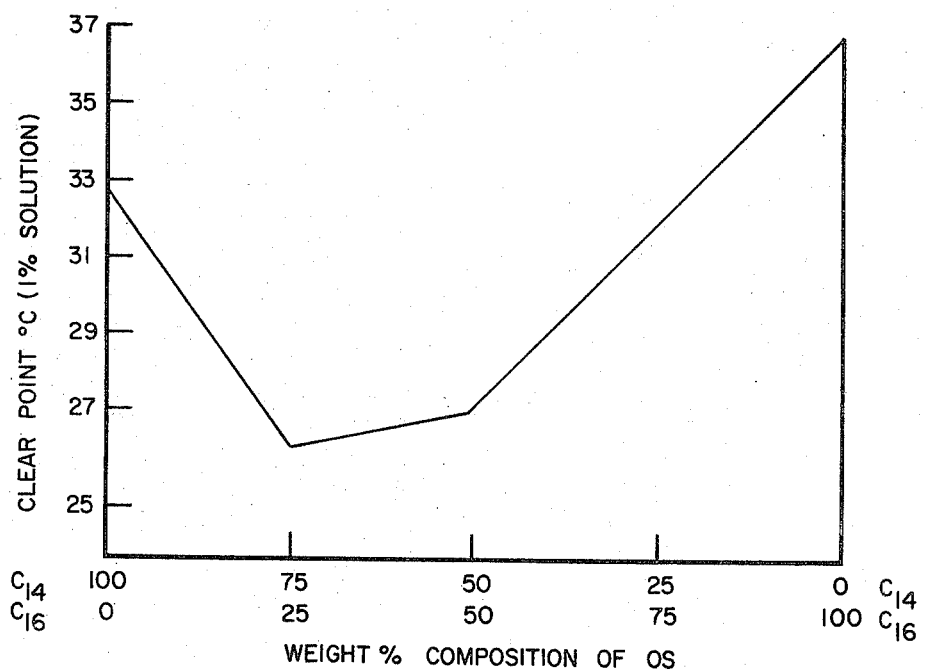
FIG. 2 shows the clear point (temperature) for olefin sulfonate compositions that are predominantly $C_{14}$ and $C_{16}$ mixtures. The "clear point" is the temperature below which cloudiness develops. A low "clear point" is desired by the housewife to provide clear dishwashing solutions.

Blends of $C_{14}$ and $C_{16}$ olefin sulfonates of Example V and of this example were made in various proportions to determine the clear point of a 1 percent solution (by weight in water). The transition temperature between clear and cloudy was noted and plotted in FIG. 2 for various proportions of $C_{12}$ and $C_{14}$ olefin sulfonates. Clear points below about 29°C are preferred corresponding to $C_{14}/C_{16}$ olefin ratios of from about 5.7/1 to about 1/2. More preferred are the solutions with clear points below about 28°C corresponding to $C_{14}/C_{16}$ olefin ratios of from about 4/1 to about 3/2. Even more preferred are the systems with clear points below about 27°C corresponding to $C_{14}/C_{16}$ olefin ratios of from about 3.5/1 to about 2/1. Data used in preparing the table of FIG. 2 are tabulated. For convenience, the weight ratio of sulfonate mixtures are used; however, this corresponds substantially to the ratios of $C_{14}/C_{16}$ starting olefins.

| Weight Ratio of $C_{14}$ Sulfonates of Example V/ $C_{16}$ Sulfonates of Example VI | Clear Point, °C |
|---|---|
| 1/0 | 33 |
| 3/1 | 26 |
| 1/1 | 27 |
| 1/3 | 32 |
| 0/1 | 37 |

EXAMPLE VII

Example V was repeated in several series of experiments where the mol percentage of $SO_3$ in the $SO_3$-$N_2$ sulfonation feed covered the range from about 2 to about 6, where the olefin feed rate covered the range from 17.6 to 32 grams per hour per peripheral millimeter of the reactor, where the $SO_3$ rate covered the range from 1.47 to 2.26 moles per hour, where reactor temperatures covered the range from 30°-40°C, and where the mol ratio of $SO_3$ to olefin covered the range down to about 0.95.

Increasing the ratio of $SO_3$ to olefin reduced the free oil content of the sulfonation effluent and increased the color of the olefin sulfonates when measured as a 5 percent aqueous solution of the soluble salts after saponification and neutralization. (Klett-Summerson Test)

Increasing the concentration of $SO_3$ in the nitrogen carrier gas (at a fixed $SO_3$/olefin ratio) increased the conversion of the olefin in the sulfonation reaction but in a lower proportion than the color increase of the product olefin sulfonates.

Within limits, olefin conversion in the sulfonation reaction is inversely proportional to the olefin feed rate. Typically, efficient conversion occurs at 17–18 gms/hr./peripheral circumferal mm. of the reactor.

The relationship between color of the product olefin sulfonates and olefin conversion is nearly linear below 96 percent conversion. Above this level, color development increases sharply.

EXAMPLE VIII

The foregoing experiments are repeated with other sulfonation systems and conditions, including pot type reactors, sprayed chamber reactors, and the like, using saponification under various conditions of temperature and with various arrangements for immediate and delayed neutralization or hydrolysis of the sulfonation effluent as a separate step before complete saponification and using various proportions of caustic or alkaline substance ranging from about stoichiometric (1:1) based on the number of moles of sulfonic acid radicals or precursors present in the sulfonation effluent to about a 50 percent excess of mols of caustic or alkaline substance.

We claim:

1. A composition of matter consisting essentially of monoolefins having from about 12 to about 16 carbon atoms per molecule and averaging from about 14.1 to about 15.9 carbon atoms per molecule wherein the weight ratio of $C_{14}$ olefins to $C_{16}$ olefins is from about 5.7/1 to about 1/2, said olefins consisting essentially of from about 60 to about 90 mol percent vinyl olefins, from about 3 to about 30 mol percent vinylidene olefins and from about 3 to about 12 mol percent internal olefins.

2. The composition of claim 1 wherein the weight ratio of $C_{14}$ olefins to $C_{16}$ olefins is from about 4.0/1 to about 3.2.

3. The composition of claim 1 wherein the weight ratio of $C_{14}$ olefins to $C_{16}$ olefins is from about 3.5/1 to about 2/1.

4. The composition of claim 1 wherein olefins having 14 carbon atoms per molecule consist essentially of from about 80 to about 90 mol percent vinyl olefins, from about 5 to about 12 mol percent vinylidene olefins and from about 5 to about 12 mol percent internal olefins, and olefins having 16 carbon atoms per molecule consist essentially of from about 60 to about 70 mol percent vinyl olefins, from about 20 to about 30 mol percent vinylidene olefins and from about 5 to about 12 mol percent internal olefins.

5. The composition of claim 4 wherein the weight ratio of $C_{14}$ olefins to $C_{16}$ olefins is from about 4.0/1 to about 3/2.

6. The composition of claim 4 wherein the weight ratio of $C_{14}$ olefins to $C_{16}$ olefins is from about 3.5/1 to about 2/1.

7. The composition of claim 1 wherein the olefins on a weight percent basis are about 0.4 percent dodecenes, about 66.2 percent tetradecenes and about 33.4 percent hexadecenes, said olefins consisting essentially of about 79.2 mol percent vinyl olefins, about 12.5 mol percent vinylidene olefins and about 8.3 mol percent internal olefins.

* * * * *

UNITED STATES PATENT OFFICE
CERTIFICATE OF CORRECTION

Patent No. 3,860,528        Dated January 14, 1975

Inventor(s) William J. DeWitt and Melvin E. Tuvell

It is certified that error appears in the above-identified patent and that said Letters Patent are hereby corrected as shown below:

Column 2, line 62, reads "$C_2$", should read -- $C_{12}$ --.
Column 4, line 47, reads "futher", should read -- further --.
Column 5, line 14, reads "Eamples", should read -- Examples --.
Column 12, line 26, reads "3.2", should read -- 3/2 --.

Signed and sealed this 8th day of April 1975.

(SEAL)
Attest:

RUTH C. MASON
Attesting Officer

C. MARSHALL DANN
Commissioner of Patents
and Trademarks